Patented Nov. 25, 1941

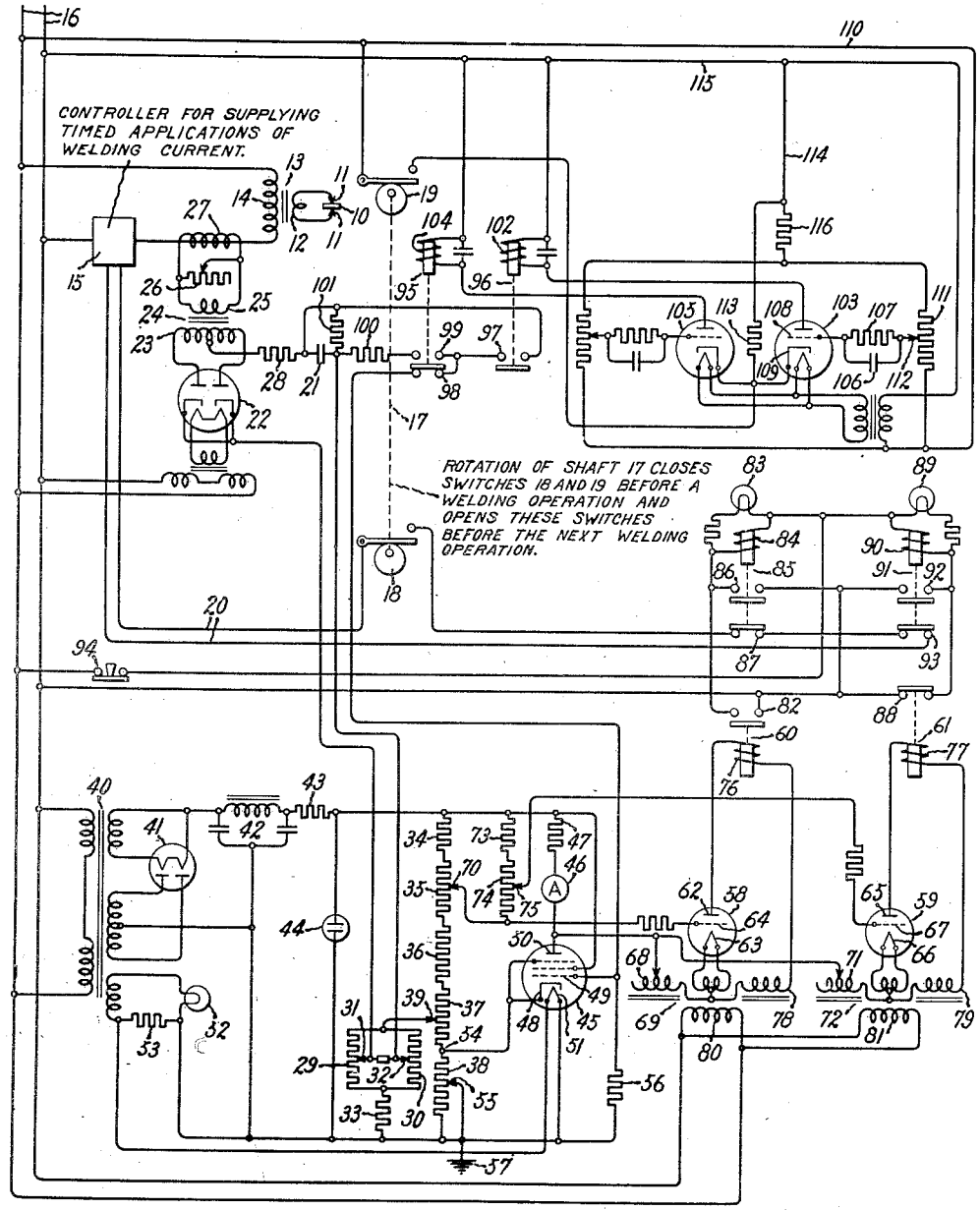

2,264,067

UNITED STATES PATENT OFFICE 2,264,067

RESISTANCE SPOT WELDING SYSTEM

Dudley E. Chambers, Scotia, N. Y., assignor to General Electric Company, a corporation of New York Application August 19, 1939, Serial No. 291,035

6 Claims. (Cl. 219—4)

My invention relates to an ampere second consistency control for resistance spot welding systems.

In the resistance spot welding of stress members or other important products where it is not possible to make mechanical tests to determine the dependability of the welds, I propose to determine their dependability by comparing the ampere second value of each weld with the ampere second value of a standard weld and to indicate undesirable variations from the standard by suitable signals or by arresting the operation of the welding system or both.

Since, in resistance spot welding, the welding pressure can be accurately controlled and checked, and furthermore, since the thickness and surface condition of the work parts are fairly uniform, the only variation that may result in a defective weld is that due to variations in the time and amount of current flowing. Thus, the ampere second value for each weld gives a dependable indication of the nature of the weld.

Variations in the amount and time of flow of the welding current may result from many causes. When the flow of welding current to successive spot welds is controlled by a mechanically operated switch, faulty operation of the switch may vary both the time and amount of current supplied in making a weld and may result in a defective weld if the variation from the desired normal is too great. Even in electric valve circuit controls where the time and amount of welding current flowing is governed by a controlled rectifier, occasions arise when, due to the faulty operation of a rectifier which has not yet failed, an incorrect amount of welding current is supplied in making a weld. Furthermore, in portable spot welding operations where extremely long leads are employed for supplying the welding current to the welding electrodes the inductance of the welding circuit and consequently the welding current may change greatly due to the relative positions of the welding conductors and their positions relative to magnetizable materials.

Since resistance spot welding operations may be performed with great rapidity, it is not always possible to use a control that depends for its operation on the use of induction or ballistic relays, primarily due to the resetting time required by such relays. There is, consequently, a need in the resistance welding industry for a reliable means for indicating the consistency of welding operations that follow one another at a high rate of speed.

It is an object of my invention to provide such means.

Further objects of my invention will become apparent from the embodiment thereof diagrammatically represented in the attached drawing.

In accordance with my invention, the ampere second value of the welding current, or as otherwise stated, the time integral of the welding current flow, is determined for each weld as a voltage charge on a condenser and a relay system is employed to compare this voltage at the end of each welding operation with a predetermined standard voltage equal to the voltage to which said condenser is charged by the ampere second value of a standard weld and thereafter to discharge said condenser before the next welding operation. Consequently, my system will operate at speeds limited only by the operating time of the relay system.

In the drawing, the work to be welded is indicated at 10 between electrodes 11 which are connected to the terminals of the secondary 12 of a welding transformer 13. The primary 14 of this transformer is connected through a circuit controlling device 15 to a source of alternating current supply 16. The circuit controlling device may be a mechanical or electromechanical switch or an electric valve circuit control such as described and claimed in United States Letters Patent No. 1,935,413 to David C. Prince, granted November 14, 1933, which functions to supply timed applications of welding current to the welding electrodes.

The control illustrated may be associated with any spot welding machine, whether of the type in which the electrodes are moved into and out of engagement with the work for each welding operation, or of the type where the electrodes are rolled along the work while the welding current is periodically supplied thereto. In either case, a shaft 17 forming a part of the machine or associated therewith is employed for closing cam-operated switches 18 and 19 after the electrodes engage the work or before welding current is supplied thereto and for opening these switches a short time before the next welding operation.

The closure of switch 18 completes the initiating circuit 20 of the circuit controlling means 15, starting the flow of welding current to the electrodes 11. The flow of welding current may be interrupted by the opening of this switch or by the operation of a timing means forming part of or associated with the circuit controlling means 15.

During each timed application of welding current, a condenser 21 is charged to a voltage value depending on the time integral of the welding current. This condenser is charged through a full wave vacuum tube rectifier 22 of the hot cathode type which receives its input voltage from the tapped secondary 23 of a voltage transformer 24 whose primary 25 is connected across an adjustable resistance 26. This adjustable resistance is connected across the secondary 27 of a current transformer whose primary is connected in the welding circuit between the circuit controlling means 15 and the welding electrodes 11. As illustrated in the drawing, the connection is made in the primary circuit of the welding transformer. A resistance 28 connected in circuit with the rectifier 22 and condenser 21 determines the charging rate for the condenser. This resistance may also be made adjustable.

It was discovered that the electron emission of the cathode of rectifier 22 generated a voltage which charged condenser 21 so that under certain circumstances the voltage on the condenser would not give a true representation of the ampere second value of the welding current flowing during certain welding operations. As pointed out and claimed in the copending application of Earl B. McDowell, Serial No. 291,025, filed concurrently herewith and assigned to the same assignee as the present invention, the disturbing effects of this self-generated voltage may be eliminated by applying a bias voltage in circuit with rectifier 22 and condenser 21. This bias voltage may be obtained from a dual resistance comprising sections 29 and 30 and sliding contacts 31 and 32 which are adjustable relative to one another to give the desired value of bias voltage and simultaneously adjusted along sections 29 and 30 to permit the proper adjustment of the voltage obtained across resistance 30. Sections 29 and 30 of this resistance are of equal value and are connected in parallel with one another and in series with a resistance 33 across a portion of a voltage divider forming part of a "vacuum tube voltmeter" circuit. This voltage divider is made up of series connected resistances 34, 35, 36, 37 and 38. A sliding contact 39 is provided for adjusting the voltage applied across resistances 29, 30 and 33.

A source of direct current voltage for the above-described voltage divider is obtained from the source of supply 16 through a transformer 40, a rectifier 41, a filter circuit 42, and a resistance 43. A voltage regulator 44 is also connected across this voltage divider. This voltage regulator comprises a glow discharge device which when in a conductive condition maintains a substantial constant voltage across its terminals for different values of current flowing therethrough.

An electric discharge device of the high vacuum type 45 is also connected across this voltage divider through a circuit including a milliammeter 46 and a resistance 47. Discharge device 45 is provided with a cathode 48, a control grid 49 and an anode 50. The cathode is heated by a filament 51 whose heating effect is maintained constant by the current supplied thereto through a circuit including a ballast lamp 52 and a resistance 53 from a secondary winding of the transformer 40. The voltage drop across resistance 38 of the voltage divider between terminal 54 and sliding contact 55 places the control grid at the proper negative potential relative to the cathode. This control grid is normally maintained at ground potential through a resistor 56, one terminal of which is connected to the ground connection 57.

The positions of sliders 32 and 39 on resistances 30 and 37 of the vacuum tube voltmeter places the positive charged terminal of condenser 21 at some positive potential above ground. If the charge attained by capacity 21 as the result of a welding operation is equal to the potential difference between ground and slider 32 no change in the potential of control grid 49 of the electric discharge device 45 will occur when the negative terminal of condenser 21 is applied to the control grid. However, if the charge on the capacity is either more or less than the potential determined by the adjustment of slider 32, control grid 49 of the electric discharge device 45 will be shifted away from ground potential for an instant when the negative terminal of the capacity is applied thereto. If the voltage across the capacity is too high, the control grid 49 becomes more negative and less current is supplied through the electric discharge device 45 and resistance 47 resulting in a decreased voltage drop across resistance 47. On the other hand, if the condenser charge is too low, the voltage drop across resistance 47 increases.

The resistance 47 is in the control circuit of electric valves 58 and 59 and variations in voltage across resistance 47 controls the conductivity of these valves, and consequently, the operation of relays 60 and 61.

Electric valves 58 and 59 are preferably electric discharge devices of the type employing an ionizable medium, such as a gas or vapor. Electric valve 58 is provided with an anode 62, a cathode 63, and a grid 64, and electric valve 59 is provided with an anode 65, a cathode 66 and a grid 67. The control circuit voltages between grid and cathode for electric valve 58 includes the alternating current component of the secondary winding 68 of a transformer 69, the voltage drops across resistances 47 and 34, and that portion of resistance 35 included in the circuit by sliding contact 70 in engagement therewith. The control circuit voltages between grid and cathode for electric valve 59 includes the alternating current component of the secondary winding 71 of a transformer 72, the voltage drops across resistances 47 and 73 and that portion of resistance 74 included in the circuit by sliding contact 75 in engagement therewith. The filaments 63 and 66 of electric valves 58 and 59 are supplied with heating current by secondary windings of the transformers 69 and 72 and the load or output circuits of these valves including the operating windings 76 and 77 of relays 60 and 61 are energized by secondary windings 78 and 79 of these same transformers. The primaries 80 and 81 of these transformers are connected to the source of supply 16.

Relay 60 controls through its contacts 82 the energization of a signal lamp 83 and the operating winding 84 of a relay 85. Upon operation, this relay completes its holding circuit and maintains the illumination of lamp 83 through its contacts 86 and opens its contacts 87 in the initiating circuit 20 of the energizing circuit of the circuit controlling device 15. Relay 61 controls through its contacts 88 the energization of a signal lamp 89 and the operating winding 90 of a relay 91. Upon operation this relay completes its holding circuit and maintains the illumination of lamp 89 through its contacts 92 and opens its contacts 93 in the initiating circuit 20 of the energizing circuit of the circuit controlling device 15. Lamps 83 and 89 are extinguished and the relays 85 and 91 are returned to their normal positions by the momentary opening of the push-button switch 94 located in the holding circuit for these devices.

The connection of condenser 21 with the vacuum tube voltmeter above described is controlled by relays 95 and 96. The comparison circuit is completed through contacts 97 of relay 96 and contacts 98 of relay 95. Before the next welding operation, condenser 21 is discharged through a circuit including contacts 97 of relay 96, contacts 99 of relay 95, and a resistor 100.

As described and claimed in the above referred to application of Earl B. McDowell, a resistance or impedance device 101 is connected across condenser 21 in the control circuit including the switching means above described for connecting this condenser with the vacuum tube voltmeter. This impedance has a low value relative to the value of the leakage impedance of this control circuit in order to prohibit undesired voltages building up across the condenser 21 due to leakage currents.

Any suitable timing circuit control may be employed for operating relays 95 and 96 in timed sequence during a welding operation so long as relay 96 operates to close its contacts 97 after welding current has ceased to flow and relay 95 closes its contacts 99 and opens its contacts 98 after the vacuum tube voltmeter has had an opportunity to function. These operations may be secured by initiating through switch 19 the function of two time delay circuits such as described and claimed in United States Letters Patent No. 2,171,347 of Elbert D. Schneider, August 29, 1939, for Time delay relay, assigned to the same assignee as the present invention.

In the arrangement illustrated, the operating winding 102 of relay 96 is completed through switch 19 and electric valve 103 and the operating winding 104 of relay 95 is completed through switch 19 and electric valve 105. These electric valves are preferably electric discharge devices of the high vacuum type.

Since the timing circuits embodying these electric valves are the same only the control for electric valve 103 will be described.

In the timing circuit embodying electric valve 103, a capacity 106 shunted by a high resistance 107 is charged by the flow of rectified current between the grid 108 and the cathode 109 of electric valve 103 so that the terminal connected to the grid becomese charged to a negative value. This occurs during negative half cycles of the source of supply 16 through the following circuit while switch 19 is open: from one terminal of the source of supply 16, through conductor 110, resistance 111, sliding contact 112 engaging this resistance, capacity 106, grid 108 and cathode 109 of valve 103, resistance 113 and conductors 114 and 115 to the other terminal of the source of supply 16. When the switch 19 is closed, the connection of the cathode 109 of electric valve 103 is effectively transferred from conductor 115 to conductor 110 and a circuit is provided through electric valve 103 for energizing winding 102 of relay 96. For a time determined by the discharge resistance 107, capacity 106 maintains the grid 108 of electric valve 103 sufficiently negative against the bias voltage across resistance 111 forming part of a voltage dividing circuit with resistance 116, to prevent current flowing through electric valve 103 in quantities sufficient to operate relay 96. After a predetermined time, the alternating current component of voltage across resistance 111 becomes dominant and causes the electric valve 103 to conduct current in sufficient quantity to energize sufficiently winding 102 of relay 96 to cause this relay to operate. The delay in the operation of the circuit just described obviously depends on various factors such as the value of capacity 106, the value of resistance 107, and the setting of slider 112 on resistance 111. The movement of this slider provides a convenient method of varying the time interval in the manner described.

The timing circuits embodying electric valves 103 and 105 are set so that beginning with the welding operation electric valve 103 energizes winding 102 of relay 96 sufficiently to operate this relay a short time after welding current ceases to flow and electric valve 105 energizes winding 104 of relay 95 sufficiently to operate this relay a short time thereafter so that between the operating periods of relays 93 and 95 the vacuum tube voltmeter circuit may function to compare the charge on condenser 21 with the predetermined voltage of the vacuum tube voltmeter circuit corresponding to the voltage to which the condenser is charged in the making of a standard weld. The operation of relay 95 should follow the operation of relay 96 before condenser 21 has discharged through resistance 56 to a voltage value that would give a faulty operation of the relay system controlled by the vacuum tube voltmeter. Before the next welding operation, switch 19 must have opened for a sufficient length of time to allow the capacitors of the timing circuit to become charged again ready for the next timing operation initiated by the closing of switch 19.

In the drawing, the system has been illustrated in its deenergized condition. Normally, electric valve 58 is non-conducting and electric valve 59 is conducting resulting in the indicating circuit being deenergized by reason of both relays 60 and 61 having their contacts 82 and 88 open.

In view of the above description, the operation of the system is believed to be apparent. Briefly summarized, it is as follows: After the electrodes 11 engage the work 10, switches 18 and 19 are closed. The closure of switch 18 initiates a timed application of welding current which, through rectifier 22, charges condenser 21 to a voltage corresponding to the ampere second value of the welding current. The closure of switch 19 initiates the operation of the timing circuits embodying electric valves 103 and 105 which are so adjusted that after the welding current has ceased to flow, relay 96 closes its contacts 97. This completes the connection of condenser 21 with the vacuum tube voltmeter. If the charge attained by the capacity as the result of a weld is equal to the potential difference between ground and the setting of the slider 32 on resistance 30, no change in the grid potential of electric valve 45 will result when the negative terminal of capacity 20 is applied thereto because its grid is normally maintained at ground potential through resistance 56. However, if the charge on capacity 21 is either more or less than the potential determined by the adjustment of slider 32 on resistance 30, the grid of electric valve 45 will be shifted away from ground potential for an instant when the negative terminal of capacity 21 is applied thereto by the operation of relay 96. If the voltage across capacity 21 is too high, as pointed out above, the voltage drop across resistance 47 decreases and electric valve 39 is rendered non-conducting permitting relay 61 to close its contacts 88. The closure of these contacts will light lamp 89 and operate relay 91 which by closing its contacts 92 maintains its energization and the energization of lamp 89 until switch 94 is momentarily opened to reset the system. The operation of relay 91 also opens control circuit 20 by the opening of its contacts 93. This will prohibit the initiation of another welding operation until the circuit is reset by operating push button 94. On the other hand, if the voltage of condenser 21 is too low, the voltage drop across resistance 47 will increase causing electric valve 58 to become conductive and thus operate relay 60. This relay, by closing its contacts 82, lights lamp 83 and operates relay 85 which, by closing its contacts 86, maintains its energization and the illumination of lamp 83 and at the same time opens control circuit 20 of the circuit controlling device 15 through its contacts 87. This prevents further operation of the welding system until the reset button 94 is momentarily opened to deenergize relay 85. It is thus apparent that after each welding operation the system functions to indicate whether the ampere second value of the weld just made is too high or too low. On the other hand, if the ampere second value is correct, no indication will be given and the system will be free to continue its operation.

A short time after the vacuum tube voltmeter and the relay system associated therewith have had an opportunity to function, the timing circuit embodying electric valve 105 operates, energizing the relay 95. This relay disconnects capacity 21 from the vacuum tube voltmeter at its contacts 98 and through its contacts 99 completes a discharging circuit through resistance 100 for condenser 21. Subsequently switches 18 and 19 open. The time during which switch 19 remains open before the next welding operation must be sufficient to allow the capacities in the timing circuits including electric valves 103 and 105 to become charged again ready for the next timing operation initiated by the closing of switch 19.

In order to calibrate the system, standard welds having the proper ampere second values are made and the system adjusted by adjusting resistance 26 until the pointer on milliammeter 46 does not move, or at most only slightly flickers when a weld is checked. The sensitivity of the indicator may be controlled by adjusting slider 32 on resistance 30 and by adjusting sliders 70 and 75 on resistances 35 and 74 which latter are normally used to balance the low and high sensitivities but may be used to obtain additional sensitivity if the adjustment of slider 32 on resistance 30 is not sufficient. In the particular arrangement, it is usually advisable to adjust slider 75 because in doing so, it has no effect on the voltage adjustment obtained by moving slider 70. The time delay in the operation of relay 96 may be controlled by adjusting slider 112 on resistance 111 and the same adjustment may be made for relay 95 in the timing control associated therewith.

In order to simplify the diagrammatic illustration of the system illustrated in the drawing, the usually employed time delay relay system controlling the application of power to the anode circuits of the valves has been omitted. The drawing has also been simplified by omitting mechanical features of the welding machine embodying or having associated therewith the shaft 17. These and other simplifications have been made in order to present the invention as clearly as possible.

It is to be understood that various modifications may be made in the system illustrated and described without departing from the spirit and scope of my invention. I aim, consequently, in the appended claims to cover all those modifications which come within the true spirit and scope of my invention.

What I claim as new and desire to secure by Letters Patent of the United States is:

1. In a control system, a circuit, means for supplying a timed application of current through said circuit, means for determining as a voltage across a condenser the time integral of said application of current, means for establishing a standard voltage equal to the voltage to which said condenser is charged by the time integral of a desired standard application of current through said circuit, and means for comparing the voltage of said condenser with said standard voltage after said supply means has furnished a timed application of current through said circuit.

2. In a control system, a circuit, means for supplying timed applications of current through said circuit, means for determining as a voltage across a condenser the time integral of each of said timed applications of current, means for establishing a standard voltage equal to the voltage to which said condenser is charged by the time integral of a desired standard application of current through said circuit, means for comparing the voltage of said condenser with said standard voltage after each timed application of current through said circuit, and means having a predetermined time sequence relative to the time of said current applications and the time between them for connecting and comparing said condenser voltage with said standard voltage and for thereafter discharging said condenser before another timed application of current passes through said circuit.

3. In a control system, a circuit, means for supplying timed applications of current through said circuit, a condenser, means for charging said condenser to voltage values corresponding to the ampere second values of successive timed applications of current flow through said circuit, mean for establishing a comparison voltage equal in value to the voltage to which said condenser is charged upon the flow of a desired timed application of current through said circuit, and means for comparing the voltage of said condenser with said standard voltage after each application of current through said circuit.

4. In a control system, a circuit, means for supplying timed applications of current through said circuit, a condenser, means for charging said condenser to voltage values corresponding to the ampere second values of successive timed applications of current through said circuit, means for establishing a comparison voltage equal in value to the voltage to which said condenser is charged upon the flow of a desired timed application of current through said circuit, means for comparing the voltage of said condenser with said comparison voltage after each timed application of current and thereafter discharging said condenser, a signal device, and means controlled in response to a predetermined difference in said voltages for operating said signal device.

5. In a control system, a circuit, means for supplying timed applications of current through said circuit, a condenser, means for charging said condener to voltage values corresponding to the ampere second values of successive timed applications of current through said circuit, means for establishing a comparison voltage equal in value to the voltage to which said condenser is charged upon the flow of a desired timed application of current through said circuit, means for comparing the voltage of said condenser with said comparison voltage after each timed application of current through said circuit, and means responsive to a predetermined difference in said voltages for automatically arresting the operation of said means for supplying timed applications of current through said circuit.

6. In a control system, a circuit, means for supplying timed applications of current through said circuit, a current transformer having its primary in said circuit and its secondary connected across a resistance, a condenser, a transformer having its primary connected across said resistance and its secondary connected through a resistance and a rectifier in circuit with said condenser, means for establishing a standard adjustable voltage, means including a vacuum tube voltmeter for comparing the voltage of said condenser after each timed application of current through said circuit with said standard voltage and for thereafter discharging said condenser before another timed application of current through said circuit, means controlled by said vacuum tube voltmeter in response to a predetermined variation between the voltage of said condenser and said standard voltage for arresting the operation of said means for supplying timed applications of current through said circuit, and manually operated means for restoring the operation of said means for supplying timed applications of current through said circuit.

DUDLEY E. CHAMBERS.